US009396355B2

(12) United States Patent
Bhagwan et al.

(10) Patent No.: US 9,396,355 B2
(45) Date of Patent: Jul. 19, 2016

(54) MULTI-PART ENCRYPTED MESSAGES FOR SUPPORT OF SENSITIVE SYSTEMS (71) Applicant: International Business Machines Corporation, Armonk, NY (US)

(72) Inventors: Varun Bhagwan, San Jose, CA (US); Karen W. Brannon, Palo Alto, CA (US); Daniel Frederick Gruhl, San Jose, CA (US); Neal Ryan Lewis, San Jose, CA (US); Steven R. Welch, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 14/109,056

(22) Filed: Dec. 17, 2013

(65) Prior Publication Data
US 2015/0169886 A1    Jun. 18, 2015

(51) Int. Cl.
G06F 21/00    (2013.01)
G06F 21/62    (2013.01)

(52) U.S. Cl.
CPC ........ *G06F 21/6254* (2013.01); *G06F 21/6209* (2013.01)

(58) Field of Classification Search
CPC .................................................. G06F 21/6209
See application file for complete search history.

(56) References Cited

U.S. PATENT DOCUMENTS

| | | | |
|---|---|---|---|
| 6,091,818 A | 7/2000 | Campinos et al. | |
| 6,901,512 B2 | 5/2005 | Kurn et al. | |
| 7,415,109 B2 | 8/2008 | Rose et al. | |
| 2005/0086479 A1 | 4/2005 | Ondet et al. | |
| 2006/0075228 A1* | 4/2006 | Black et al. | 713/167 |
| 2007/0258584 A1 | 11/2007 | Brown et al. | |
| 2009/0019379 A1* | 1/2009 | Pendergast | G06F 17/30011 715/762 |
| 2010/0115289 A1 | 5/2010 | Han | |
| 2011/0154021 A1 | 6/2011 | McCann et al. | |

OTHER PUBLICATIONS

Summary of the HIPAA Privacy Rule, "Health Information Privacy Summary of the HIPAA Privacy Rule," U.S. Department of Health & Human Services, http://www.hhs.gov/ocr/privacy/hipaa/understanding/summary/index.html, Accessed Oct. 16, 2012, 1 page, Washington, DC, USA.
HITECH Breach Notification Interim Final Rule, "Health Information Privacy HITECH Breach Notification Interim Final Rule," U.S. Department of Health & Human Services, http://www.hhs.gov/ocr/privacy/hipaa/understanding/coveredentities/breachnotificationifr.html, Accessed Oct. 16, 2012, 3 pages, Washington, DC, USA.

(Continued)

*Primary Examiner* — Hadi Armouche
*Assistant Examiner* — Andrew Steinle
(74) *Attorney, Agent, or Firm* — Ference & Associates LLC (57) ABSTRACT

Methods and arrangements for handling encrypted messages are disclosed. The method comprising: generating a multi-part encrypted support message responsive to a request therefor; the generating comprising: inputting a base message; identifying at least one span of sensitive information; visually suppressing the at least one span of sensitive information; replacing the at least one span of sensitive information with a redaction notation; and appending at least one redaction message for the at least one span of sensitive information, the at least one redaction message containing data redacted from the at least one span of insensitive information and being encrypted for subsequent opening via at least one key. Other embodiments are disclosed.

18 Claims, 7 Drawing Sheets

(56) References Cited

OTHER PUBLICATIONS

He, Xingze et al., "Secure and Efficient Cryptosystem for Smart Grid Using Homomorphic Encryption," IEEE, 2011, pp. 1-8, IEEE Digital Library, Washington, DC, USA.

Shue, D. Y. "Method for Providing Dynamic Debug Messages in an AIX Application," IBM Technical Disclosure Bulletin, IPCOM000116951D, Dec. 1995, 3 pages, vol. 38, No. 12, PriorArtDatabase, IP.com, Intellectual Property Library.

IPCOM000212192D, "Method to implement user transparent debugging in a clustered application server environment," disclosed Nov. 4, 2011, 11 pages, PriorArtDatabase, IP.com, Intellectual Property Library.

\* cited by examiner

MULTI-PART ENCRYPTED MESSAGES FOR SUPPORT OF SENSITIVE SYSTEMS

BACKGROUND

Embodiments of the present invention relate to encryption technology, and more particularly, to methods and arrangements for handling encrypted messages that run on sensitive systems and/or systems which process sensitive data.

Supporting software solutions that run on sensitive systems and/or systems that process sensitive data can be a challenge. In addition to the general issues involved in any troubleshooting or debugging project, issues arise regarding how to handle the sensitive data so that it is not improperly exposed.

When a company with a sensitive system and/or a system that processes sensitive data suffers a major problem, the support teams from an internal information technology ("IT") help desk or from an outside service provider in the troubleshooting business (collectively, "service provider") often wish to see as much data as possible in the way of logs, crash dumps, memory dumps, etc., in order to best debug and troubleshoot the issue and come up with a patch or fix. The remedial process is often started by submitting a problem ticket/service request to the service provider. While much of the text or other information embedded inside the problem ticket/service request is of a benign nature and is in fact needed to solve the problem, there are exceptions. For example, when health care data, financial data or other sensitive information (collectively, "SI") are involved, some of this information may make it into the problem ticket/service request as part of the submitter's effort to give as much information as possible to those trying to fix the problem. The IT staff at the service provider may therefore become exposed to sensitive information, which can be highly undesirable.

The owner of the sensitive systems/sensitive data, for example, hospitals in the health care domain, wish to minimize the exposure of sensitive data and information stored in these systems for both legal and practical considerations. A common example of this situation would be encountered when it involves a system deployed at a hospital that contains Protected Health Information ("PHI") covered by the Health Information Technology for Economic and Clinical Health Act ("HITECH Act") and the Health Insurance Portability and Accountability Act ("HIPAA"), and when there is a crash in the electronic health record database. PHI is for the purposes herein deemed to include SI, in addition to Sensitive Patient/Person Information ("SPI"), Sensitive Client Information ("SCI") and other like designations which may be used interchangeably herein.

BRIEF SUMMARY

In summary, one aspect of the invention provides a method of handling encrypted messages, said method comprising: generating a multi-part encrypted support message responsive to a request therefor; said generating comprising: inputting a base message; identifying at least one span of sensitive information; visually suppressing the at least one span of sensitive information; replacing the at least one span of sensitive information with a redaction notation; and appending at least one redaction message for the at least one span of sensitive information, the at least one redaction message containing data redacted from the at least one span of insensitive information and being encrypted for subsequent opening via at least one key.

Another aspect of the invention provides an apparatus comprising: at least one processor; and a computer readable storage medium having computer readable program code embodied therewith and executable by the at least one processor, the computer readable program code comprising: computer readable code configured to generate a multi-part encrypted support message responsive to a request therefor, via: inputting a base message; identifying at least one span of sensitive information; visually suppressing the at least one span of sensitive information; replacing the at least one span of sensitive information with a redaction notation; and appending at least one redaction message for the at least one span of sensitive information, the at least one redaction message containing data redacted from the at least one span of insensitive information and being encrypted for subsequent opening via at least one key.

A further aspect of the invention provides a computer program product comprising: a computer readable storage medium having computer readable program code embodied therewith, the computer readable program code comprising: computer readable code configured to generate a multi-part encrypted support message responsive to a request therefor, via: inputting a base message; identifying at least one span of sensitive information; visually suppressing the at least one span of sensitive information; replacing the at least one span of sensitive information with a redaction notation; and appending at least one redaction message for the at least one span of sensitive information, the at least one redaction message containing data redacted from the at least one span of insensitive information and being encrypted for subsequent opening via at least one key.

For a better understanding of exemplary embodiments together with other and further features thereof, reference is made to the following description, taken in conjunction with the accompanying drawings, and the scope of the claimed embodiments will be pointed out in the appended claims.

DETAILED DESCRIPTION

It will be readily understood that the components of the embodiments, as generally described and illustrated in the figures herein, may be designed in a wide variety of different configurations in addition to the described exemplary embodiments. Thus, the following detailed description of the embodiments, as represented in the figures, is not intended to limit the scope of the claims, but is merely for illustration of certain selected exemplary embodiments as claimed herein.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of the embodiments. One skilled in the relevant art will recognize, however, that the various embodiments can be practiced without one or more of the specific details, or with other methods, components, materials, et cetera. In other instances, well-known structures, materials, or operations are not shown or described in detail to avoid obscuring aspects of the embodiments.

Additionally, the term "Sensitive Information" ("SI") is broadly used herein to include many different types of information such as health care or financial data that are either required by a particular law to be redacted from support messages or nonetheless are desired to be redacted by the owner/client. Thus Sensitive Person/Private Information ("SPI"), Sensitive Client Information ("SCI"), Protected Health Information ("PHI"), Personally Identifiable Information ("PII"), and the like are included in the SI. As shown herein, methods provide for multiple encryption for different types of data as well as different roles for recipients of the data.

The description now turns to the figures. The illustrated embodiments will be best understood by reference to the figures. The following description is intended only by way of example and simply illustrates certain exemplary embodiments as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-5. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 7. In accordance with an example embodiment, most if not all of the process steps, components and outputs discussed with respect to FIGS. 1-5 can be performed or utilized by way of a processing unit or units and system memory such as those indicated, respectively, at 16' and 28' in FIG. 7, whether on a server computer, a client computer, a node computer in a distributed network, or any combination thereof.

Figure 1:
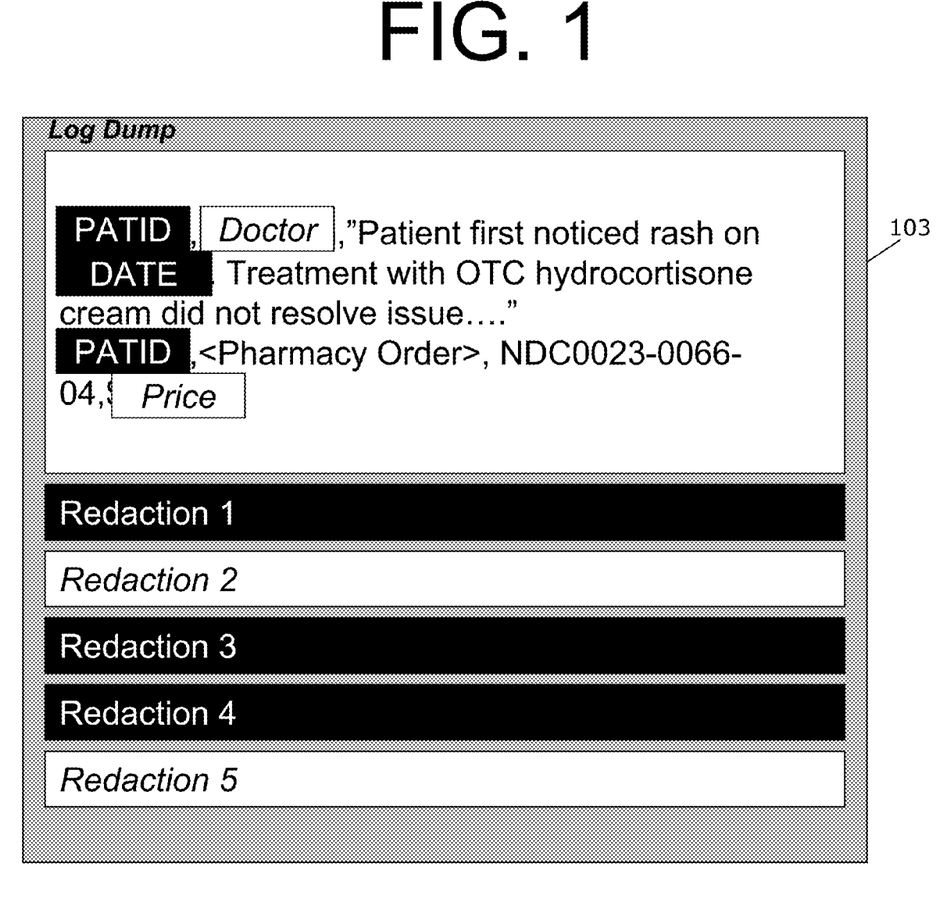
FIG. 1 shows an encrypted support message assembled by a log server from a log dump.
Figure 7:
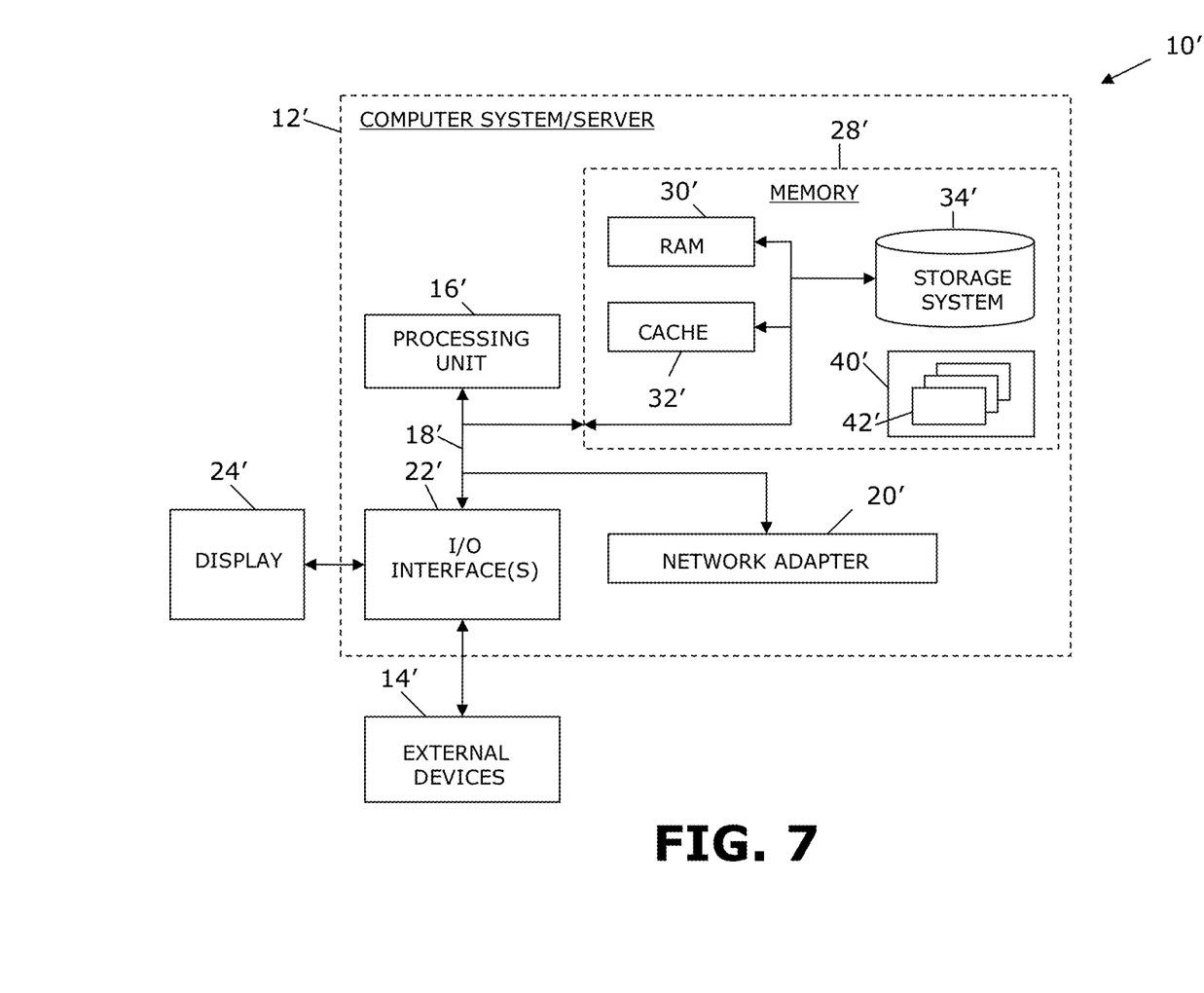
FIG. 7 illustrates a computer system.

To facilitate easier reference, in advancing from FIG. 1 to and through FIG. 7, a reference numeral is advanced by a multiple of 100 in indicating a substantially similar or analogous component or element with respect to at least one component or element found in at least one earlier figure among FIGS. 1-7.

Broadly contemplated herein, in accordance with at least one embodiment of the invention, are multi-part encrypted messages for supporting software solutions that run on sensitive systems and/or systems which process sensitive data. In many support functions, service providers such as an IT help desk or a third party company troubleshooting problems for clients, the submitters of the problem who are having difficulty with a piece of hardware software or an application, tend to submit a problem ticket with the service provider that may contain SI embedded within.

Current approaches in the domain of log analysis either share the entirety of the sensitive data, or encrypt all of it. So far, a "middle ground" approach has proven highly elusive, where only the sensitive data elements are encrypted to begin with and, with appropriate authentication, users can request access to specific sensitive data elements should they deem those elements to be pertinent to the log analysis/troubleshooting. Such an encryption system is advantageous in that the sensitive information that must be shielded from all except the few on a need to know basis still can be selectively accessed by those few if truly needed to solve the support problem at hand.

In accordance with at least one embodiment of the invention, support teams from an IT help desk or an outside IT solutions company become able to view logs, crash dumps, memory dumps and the like in order to troubleshoot and perhaps debug the cause of the crash, while preserving the privacy of SI therein to the maximum possible extent before it is viewed by a third party support technician viewer at the service provider. This is done by utilizing encryption over multi-part messages that are sent between the secure (or sensitive) system interface and the service technician viewer at the service provider. Thus in the instance of electronic patient data system deployed at a hospital that contains PHI covered by HITECH and HIPAA, when there is a crash in the electronic health record database there are specific elements of data that should be suppressed in order to maintain patient privacy, such as the patient name and dates of patient treatment; all date elements except year; address smaller than state; age over 89 and all age indicators (birth day, death day); medical record numbers; telephone numbers; social security number; health plan number; face images; biometric identifiers; vehicle IDs; and generally any other unique identifying number, characteristic, or code. Additionally there are elements such as the name of the treating doctor, and the dollar values associated with a particular medication or procedure that the client may additionally wish to be suppressed from the view of service providers. In accordance with at least one embodiment of the invention, sensitive information data elements required by the law, such as HIPAA, as well as data the client would otherwise wish to keep hidden from all except those on the support staff with a "need to know", such as, for example, a particular person's salary, are encrypted.

As will be seen herein, at least one embodiment of the invention allows for one or more members of a support team to look at any SI they need to see for completing the support task at hand, while at the same time SI that is not needed for resolving the support task remains blacked out to the viewer. An additional aspect involves reducing the possibility of people examining data that they do not actually need to see via the use of active logging of a viewer's access to specific SI. If viewers on a support team know that they can be audited for all SI artifacts they view, then they may tend to view such artifacts only if absolutely required. This is opposed to a viewer simply clicking "view-all" or individually requesting access to all redacted elements if no logging/auditing is involved.

In accordance with at least one embodiment of the invention, FIG. 1 shows an encrypted support message assembled by a log server from a log dump in which five different sections of SI are blacked out and replaced by a notation of what has been redacted in each instance and why it has been redacted. Particularly, a multi-part encrypted message 101 that holds the debugging information is used. This message is encrypted for a single recipient, and it may use public/private key encryption, for example, RSA, or a more complex session key type solution, for example, Pretty Good Privacy ("PGP") or variants thereof.

As shown in FIG. 1, in accordance with at least one embodiment of the invention, the support message 103 has sections identified via analytics as likely containing SI contained in a base message. For example, analytics can be used to identify pharmacological drug names. Each of these SI-containing sections is referred to as a span. Each span is coded with a "begin" and "end" and a notation of the type of data in it that has been redacted. The primary support message is assembled by the log server to have all spans "blacked out" and replaced by a notation of what has been redacted and why. Each span is further identified or coded, for example, via a particular color or symbol scheme to show a redaction that is required by law (shaded in black in the drawing) as well as a redaction that is requested by the owner of the data (shown as white blocks with italics in the drawing). Other categories of redacted material can be used in addition to the scheme of two described herein.

In accordance with at least one embodiment of the invention, with continued reference to FIG. 1, HIPAA requires the suppression of certain patient information to maintain patient privacy such as patient name ("PATID"), shown here as Redactions 1 and 4, and dates ("DATE"), shown here as Redaction 3. The submitting client has also requested redaction of additional SI that the client would not want the IT staff exposed to, e.g., the treating doctor's name, ("Doctor"), shown here as Redaction 2, and the price for the medication or procedure, ("Price"), shown here as Redaction 5.

Figure 2:
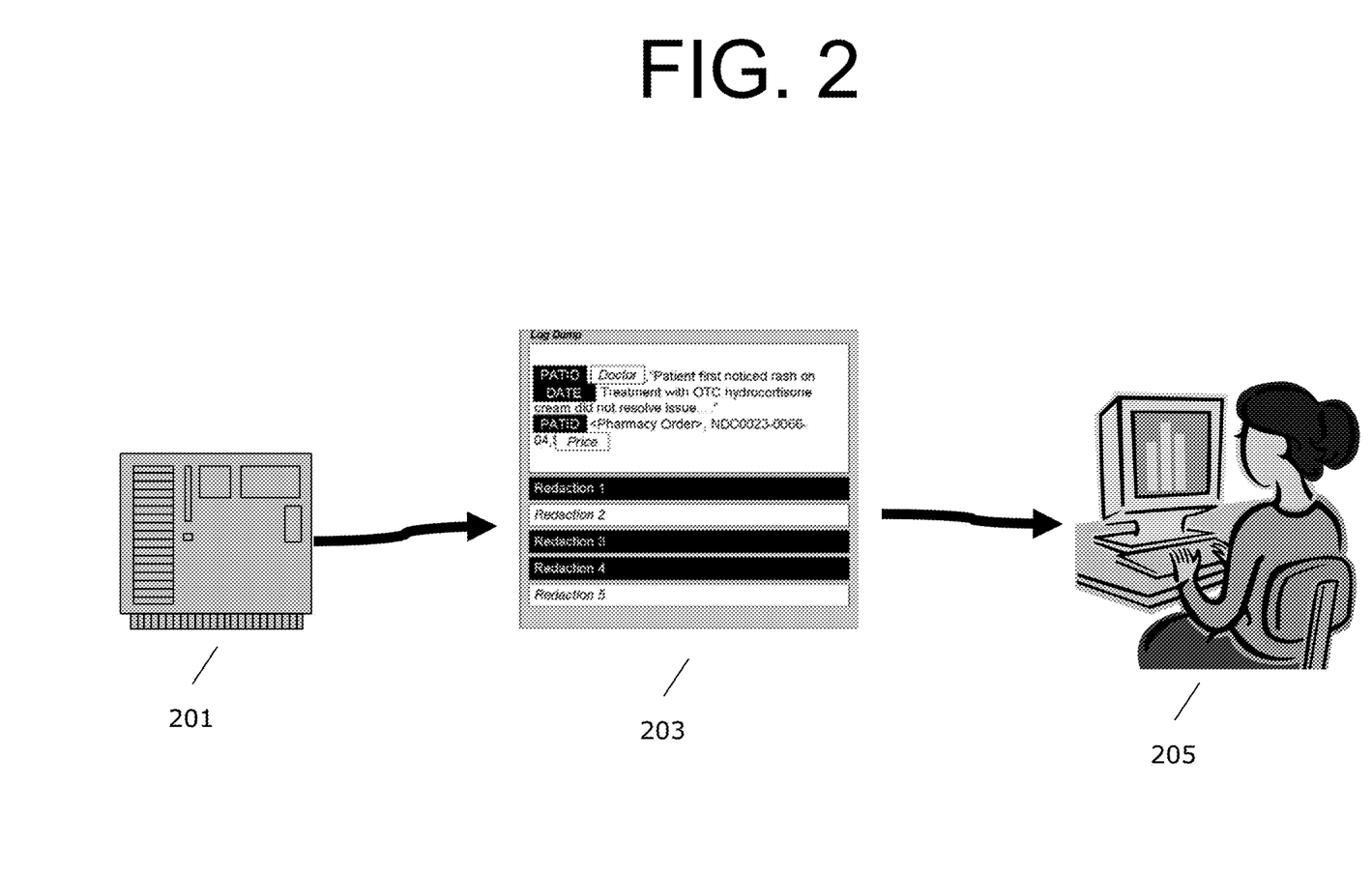
FIG. 2 shows a support technician viewer receiving a redacted support message.

In accordance with at least one embodiment of the invention, FIG. 2 shows a support technician viewer receiving a redacted support message from the log server which is encrypted with public/private key encryption ensuring that the support technician viewer is the only person who can view the redacted support message.

In accordance with at least one embodiment of the invention, additional messages shown under the text of the message 103 hold the data that has been redacted, and are referred to hereinafter as "redaction messages." The redaction messages have an additional level of encryption with a unique key for each segment. These redaction messages are presented in the same order as the redaction spans appear in the text as the message is read from left to right and top to bottom. For example, "PATID" in the upper left of the support message 103 corresponds to the first redaction message (Redaction 1) shown under the support message text, and the next redaction to the right, "Doctor," corresponds to the second redaction message (Redaction 2). The redacted messages also are presented using the corresponding visual coding scheme that the individual text black out redactions bear to distinguish between redactions required by particular laws and those required by the submitter of the problem ticket, i.e., "PATIP"
and "Redaction 1" have the same visual coding for being required by law, "Doctor" and "Redaction 2" share the same visual coding for being requested by the submitter, and so forth. Thus each blacked out span of information in the support message is directly correlated to a redaction message holding the data that has been redacted.

In accordance with at least one embodiment of the invention, FIG. 2 shows a support technician viewer 205 receiving a redacted support message 203 from a log server 201, wherein the message 203 is encrypted with public/private key encryption ensuring that the support technician viewer is the only person who can view the redacted support message. In other words, this particular support technician viewer (205) is the only person at the service provider who also is able to obtain the keys to view the entire content of the message 203.

Figure 3:
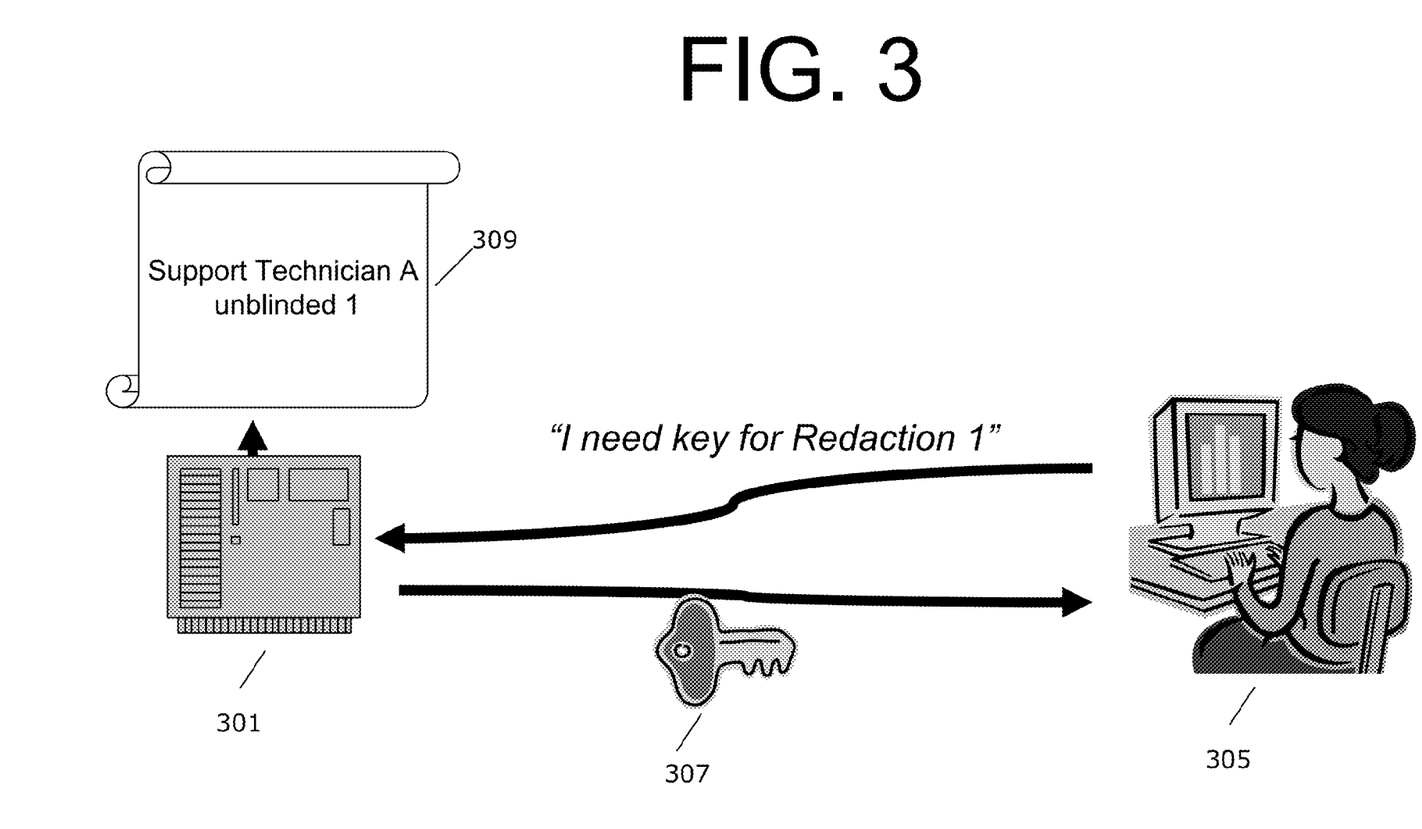
FIG. 3 shows a support technician viewer sending a request to the log server to unblind a particular redaction.

In accordance with at least one embodiment of the invention, FIG. 3 shows a support technician viewer 305 sending a request to the log server 301 to unblind a particular redaction, corresponding to Redaction 1 of FIG. 1, which request is logged for later audit by the log server 301. A key 307 with its own public/private encryption is sent to the support technician viewer 305, allowing him/her to decode and read the redaction submessage. More particularly, if a support technician viewer, Support Technician A (305), decides a need to see a redacted section of a support message, such as for example, Redaction 1 from message 103 of FIG. 1, to thereby see the patient's name, he/she can click on it to generate a request (e.g., "I need key for Redaction 1") which is sent to log server 301. This request is logged (309) (e.g., "Support Technician A unblinded 1") in log 301 for potential later auditing. The log server 301 responds to the support technician's unblinding request by providing the technician 305 with a key 307 that is needed to unblind Redaction 1. Key 307 is provided to the support technician viewer in its own public/private wrapper which allows the support technician viewer 305 to decode the redacted part/subpart of the message for Redaction 1 and see what it contains. The request to unblind a redaction may require the support technician viewer to enter a username and/or password, and/or a reason for the need to see the redacted information. The entire communication to acquire the password is encrypted as well.

In general, in accordance with at least one embodiment of the invention, only one designated support technician, "Support Technician A" for the purposes of illustration, receives a support message generated from a submitter's help ticket, for example, support message 103 of FIG. 1, and thus the only one with ultimate ability to see the entire support message contents. Others on Support Technician A's support team receive the data package that contains the support message but usually there is nothing inside it, or the message says "fully redacted" or the like and thus in such a case they do not see any content at all, not even the non-redacted text as is illustrated in FIG. 1. Therefore only the one support technician viewer end user at the service provider who receives a particular support message, in this case Support Technician A, is able to receive the appropriate keys to see the entire content of that support message.

However, in accordance with at least one variant embodiment of the invention, it is possible to have two or more levels of access such that more than one designated support technician viewer receives a particular support message. For example, a team approach can be used where only Support Technician A and a second support technician, Support Technician B, are authorized to receive all support messages from a particular account and thus authorized to see the entire message in the manner described herein. The teams of course can have as many support technician viewers as is desired.

Figure 4:
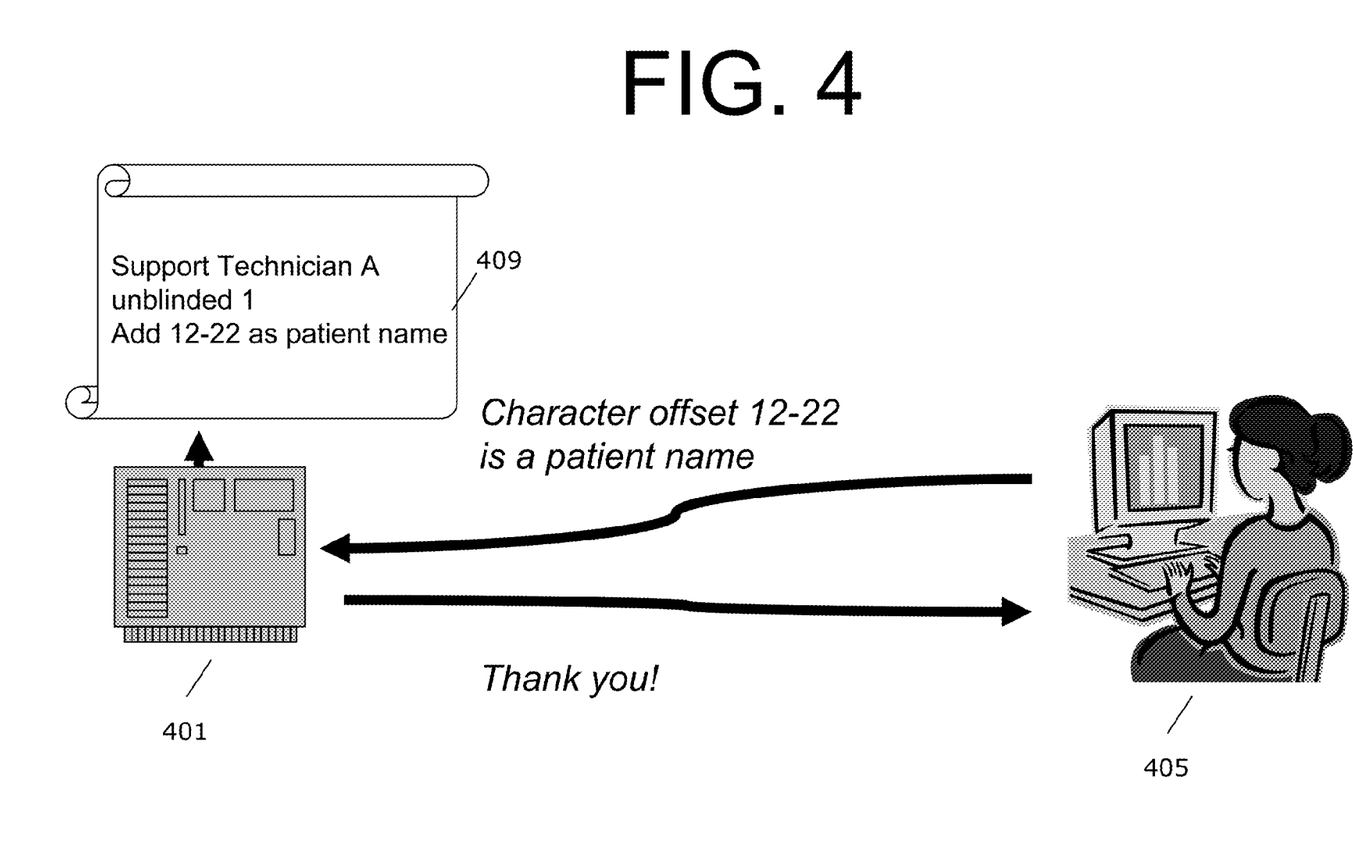
FIG. 4 shows a support technician viewer selecting content in the redacted support message that is believed to be SI but has not been redacted.

In accordance with at least one embodiment of the invention, FIG. 4 shows a support technician viewer 405 selecting content in the redacted support message that is believed to be SI but has not been redacted. A message is sent back to the log server 401 requesting the additional redaction. The log server will redact such information for all future views of that support message. More particularly, FIG. 4 illustrates an instance where a support technician viewer 405, "Support Technician A," reviews a particular support message and notices content that is believed to contain SI, and which should have been redacted. Illustrated in FIG. 4 by way of example, Support Technician A notices an uncovered patient name in a support message (such as that indicated at 103 in FIG. 1). Support Technician A communicates that fact back to log server 401 by sending the message: "Character offset 12-22 is a patient name" or the like. The log server 401 then logs (409) the new redaction information, "Add 12-22 as patient name." The log server 401 sends a "Thank you!" message and automatically redacts that information for any and all future views of that support. It is also possible in an alternative embodiment to introduce another person in the same loop, where they have final say in Support Technician A's recommendation to redact additional SI or not.

Figure 5:
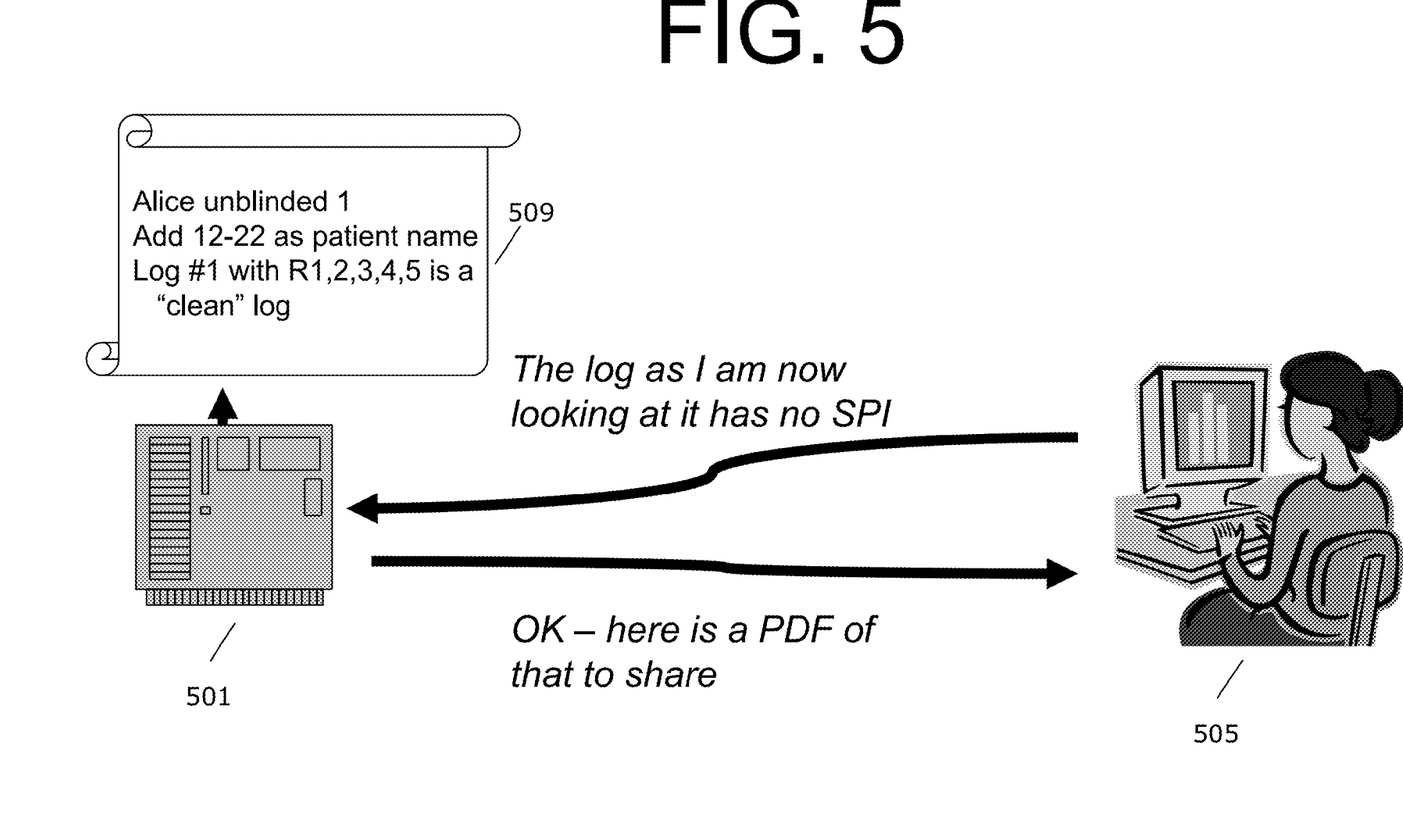
FIG. 5 shows the support technician viewer certifying that the redacted support message has no unredacted sensitive person information ("SPI") and this certification is logged.

In accordance with at least one embodiment of the invention, FIG. 5 shows a support technician viewer 505 certifying that a redacted support message has no SPI, and this certification is logged. A shareable PDF of the log is sent to the support technician viewer 505. Particularly, as shown in FIG. 5, once Support Technician A (505) has reviewed a support message (such as the message 103 in FIG. 1) and the support message is deemed to be fully redacted, Support Technician A can certify that fact as shown in FIG. 5. In this instance Support Technician A (505) sends a message back to the log server 501: "The log as I am now looking at it has no SPI," (SPI-Sensitive Patient Information) and the server responds back with a message: "OK—here is a PDF of that to share" and the certification is entered (509) into the log server: "Log #1 with R1,2,3,4,5 is a "clean" log" or the like. Others on the support team can then view the log if they need to.

In accordance with at least one embodiment of the invention, a key (such as key 307 in FIG. 3) that a support technician viewer receives in response to a request to unblind a particular piece of information is only able to be used once by that support technician viewer during an active computer session. Thus, assuming the support technician logs out at the end of the work day, it can only be used that one day. In an alternative embodiment, a key for a specific unblinding request can be designed to work a given number of times, or indefinitely, for the requesting support technician. Restrictions can be applied such that a key generated for unblinding a particular redaction, for example, "Redaction 1" in FIG. 1 cannot ever be used to unblind a different redacted part/subpart of the support message, such as, for example, "Redaction 5."

Figure 6:
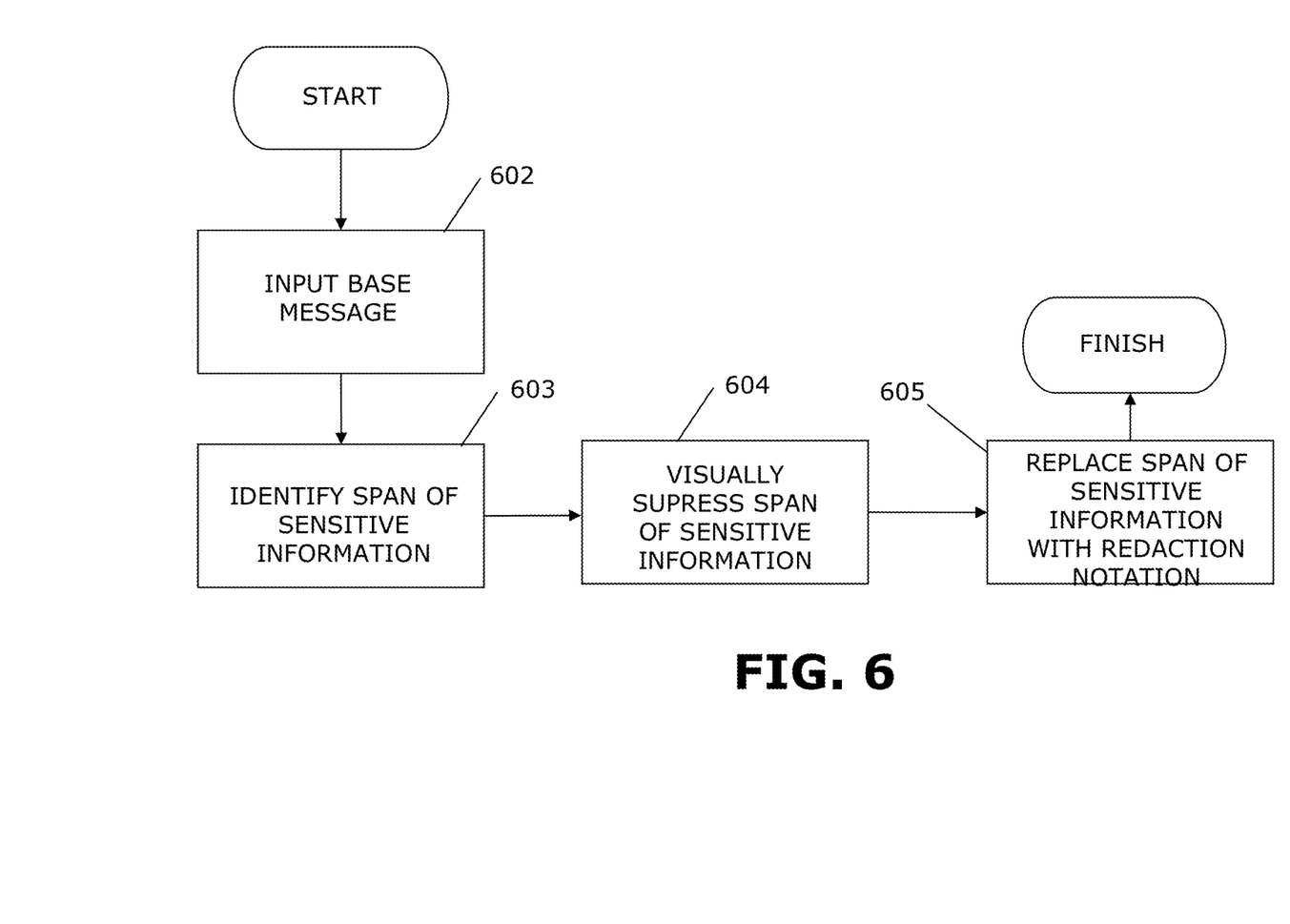
FIG. 6 sets forth a process more generally for handling encrypted messages.

FIG. 6 sets forth a process more generally for handling encrypted messages, in accordance with at least one embodiment of the invention. It should be appreciated that a process such as that broadly illustrated in FIG. 6 can be carried out on essentially any suitable computer system or set of computer systems, which may, by way of an illustrative and non-restrictive example, include a system such as that indicated at 12' in FIG. 7. In accordance with an example embodiment, most if not all of the process steps discussed with respect to FIG. 6 can be performed by way a processing unit or units and system memory such as those indicated, respectively, at 16' and 28' in FIG. 7.

FIG. 6 sets forth a process more generally for handling encrypted messages, in accordance with at least one embodiment of the invention. It should be appreciated that a process such as that broadly illustrated in FIG. 6 can be carried out on essentially any suitable computer system or set of computer systems, which may, by way of an illustrative and non-restrictive example, include a system such as that indicated at 12' in FIG. 7. In accordance with an example embodiment, most if not all of the process steps discussed with respect to FIG. 6 can be performed by way a processing unit or units and system memory such as those indicated, respectively, at 16' and 28' in FIG. 7.

As shown in FIG. 6, a base message is inputted (602). A span of sensitive information is identified (603). The span of sensitive information is visually suppressed (604) and the span of sensitive information is replaced with a redaction notation (605).

Referring now to FIG. 7, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method of handling encrypted messages, said method comprising:
    generating a multi-part encrypted support message responsive to a request therefor;
    said generating comprising:
    inputting a base message;
    identifying two or more spans of sensitive information;
    visually suppressing the two or more spans of sensitive information;
    said visual suppressing comprising visually replacing the two or more spans of sensitive information with a redaction notation, wherein the redaction notation comprises a visual indication of a type of information that has been redacted, and a visual indication of a reason for redaction;
    appending at least one redaction message which relates to the redaction notation, the at least one redaction message containing data redacted from the two or more spans of sensitive information and being encrypted for subsequent opening via at least one key; and
    removing, via decryption, the redaction notation from at least a subset of the two or more spans of sensitive information responsive to receiving a request for access to the sensitive information within the at least a subset of the two or more spans of sensitive information; wherein the at least one subset is less than all of the two or more spans of sensitive information.

2. The method according to claim 1, wherein said visual replacing comprises coding the two or more spans of sensitive information with a beginning point, an end point, and an indication of a type of sensitive information being visually suppressed.

3. The method of claim 1, wherein visually suppressed spans that replace redacted sensitive information are coded to indicate to a service technician viewer a particular category of encrypted sensitive information visually suppressed, wherein categories of sensitive information comprise sensitive information required by law to be minimally exposed to third parties and sensitive information that the service requestor additionally requests to be shielded from third party viewers.

4. The method of claim 1, wherein the at least one key is only available to a support technician viewer who initially received said support message.

5. The method of claim 1, wherein more than one service technician viewer receives the support message and all viewers are able to request the at least one key.

6. The method of claim 1, wherein the at least one key can only be used for the redaction message it corresponds to and can only be used during an active computer session of a support technician viewer.

7. The method of claim 1, wherein the at least one key can be used more than one time by a support technician viewer.

8. The method of claim 1, wherein each request for the at least one key is logged into a log server.

9. The method of claim 1, wherein each request for the at least one key is encrypted.

10. The method of claim 1, wherein a support technician viewer, upon noticing the presence of additional sensitive information that was not visually suppressed in the support message, requests a log server to redact such additional sensitive information in the future and the log server will redact the additional sensitive information for all future views of said support message.

11. The method of claim 1, wherein a support technician viewer sends a message to a log server that certifies a particular message contains no sensitive information, whereby a certification is logged, and the log server provides the service technician viewer with a copy of a log.

12. An apparatus comprising:
    at least one hardware processor; and
    a computer readable storage medium having computer readable program code embodied therewith and executable by the at least one hardware processor, the computer readable program code comprising:
    computer readable code configured to generate a multi-part encrypted support message responsive to a request therefor, via:
    inputting a base message;
    identifying two or more spans of sensitive information;
    visually suppressing the two or more spans of sensitive information;
    said visual suppressing comprising visually replacing the two or more spans of sensitive information with a redaction notation, wherein the redaction notation comprises a visual indication of a type of information that has been redacted, and a visual indication of a reason for redaction; and
    appending at least one redaction message which relates to the redaction notation, the at least one redaction message containing data redacted from the two or more spans of sensitive information and being encrypted for subsequent opening via at least one key; and
    removing, via decryption, the redaction notation from at least a subset of the two or more spans of sensitive information responsive to receiving a request for access to the sensitive information within the at least a subset of the two or more spans of sensitive information; wherein the at least one subset is less than all of the two or more spans of sensitive information.

13. The apparatus of claim 12, wherein said visual replacing comprises coding the two or more spans of sensitive information with a beginning point, an end point, and an indication of a type of sensitive information being visually suppressed.

14. The apparatus of claim 12, wherein in said generating step visually suppressed spans that replace redacted sensitive information are coded to indicate to a service technician viewer a particular category of encrypted sensitive information visually suppressed, wherein categories of sensitive information comprise sensitive information required by law to be minimally exposed to third parties and sensitive information that the service requestor additionally requests to be shielded from third party viewers.

15. The apparatus of claim 12, wherein in said generating step the at least one key is only available to a support technician viewer who initially received said support message.

16. The apparatus of claim 12, wherein in said generating step more than one service technician viewer receives the support message and all viewers are able to request the at least one key.

17. The apparatus of claim 12, wherein in said generating step the at least one key can only be used for the redaction message it corresponds to and can only be used during an active computer session of a support technician viewer.

18. A computer program product comprising:
   a non-transitory computer readable storage medium having computer readable program code embodied therewith, the computer readable program code comprising:
   computer readable code configured to generate a multi-part encrypted support message responsive to a request therefor, via:
   inputting a base message;
   identifying two or more spans of sensitive information;
   visually suppressing the two or more spans of sensitive information;
   said visual suppressing comprising visually replacing the two or more spans of sensitive information with a redaction notation, wherein the redaction notation comprises a visual indication of a type of information that has been redacted, and a visual indication of a reason for redaction; and
   appending at least one redaction message which relates to the redaction notation, the at least one redaction message containing data redacted from the two or more spans of sensitive information and being encrypted for subsequent opening via at least one key; and
   removing, via decryption, the redaction notation from at least a subset of the two or more spans of sensitive information responsive to receiving a request for access to the sensitive information within the at least a subset of the two or more spans of sensitive information; wherein the at least one subset is less than all of the two or more spans of sensitive information.

* * * * *